United States Patent
Chiba et al.

(10) Patent No.: US 12,007,008 B2
(45) Date of Patent: Jun. 11, 2024

(54) LEFT-RIGHT WHEEL DRIVING DEVICE

(71) Applicant: MITSUBISHI JIDOSHA KOGYO KABUSHIKI KAISHA, Tokyo (JP)

(72) Inventors: Motoharu Chiba, Tokyo (JP); Kiminobu Terao, Tokyo (JP); Naoki Takahashi, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/434,695

(22) PCT Filed: Dec. 24, 2019

(86) PCT No.: PCT/JP2019/050666
§ 371 (c)(1),
(2) Date: Aug. 27, 2021

(87) PCT Pub. No.: WO2020/194950
PCT Pub. Date: Oct. 1, 2020

(65) Prior Publication Data
US 2022/0196130 A1    Jun. 23, 2022

(30) Foreign Application Priority Data

Mar. 28, 2019   (JP) .................................. 2019-063552

(51) Int. Cl.
*F16H 48/36*      (2012.01)
*B60K 1/02*       (2006.01)
(Continued)

(52) U.S. Cl.
CPC .............. *F16H 48/36* (2013.01); *B60K 1/02* (2013.01); *B60K 17/165* (2013.01); *F16H 57/04* (2013.01);
(Continued)

(58) Field of Classification Search
CPC ..... B60K 1/02; B60K 2023/043; F16H 48/36; F16H 2048/364–368
See application file for complete search history.

(56) References Cited

U.S. PATENT DOCUMENTS 9,221,334 B2 * 12/2015 Knoblauch .............. B60K 1/02
10,207,572 B2 * 2/2019 Makino ................ B60K 7/0007
(Continued)

FOREIGN PATENT DOCUMENTS

CN    113544004 A    10/2021
JP    11-240349 A    9/1999
(Continued)

OTHER PUBLICATIONS

English translation of International Preliminary Report on Patentability and Written Opinion of the International Searching Authority for International Application No. PCT/JP2019/050666, dated Sep. 28, 2021.

(Continued)

*Primary Examiner* — Ernesto A Suarez
*Assistant Examiner* — James J Taylor, II
(74) *Attorney, Agent, or Firm* — Birch, Stewart, Kolasch & Birch, LLP

(57) ABSTRACT

A left-right wheel driving device (10) includes: a casing (15) including a reservoir (18) that stores oil; a suction port (19) that is disposed on the reservoir (18) and that sucks the oil from the reservoir (18); and two gears (34) that are each having helical teeth, that are supported so as to be rotatable about a rotating shaft (13) at least in one direction (D), that are provided on a power transmission path that transmits power to left and right wheels of a vehicle, and that are spaced apart from each other. The suction port (19) is positioned between the two gears (34). Each of the gears (34) is offset from the suction port in an axial direction of the (Continued)

rotating shaft (13), being in a state of being partially immersed in the oil stored in the reservoir (18). The helical teeth of each of the gears (34) extend in the one direction (D) and in a direction that departs from the suction port (19).

14 Claims, 2 Drawing Sheets

(51) Int. Cl.
    *B60K 17/16*    (2006.01)
    *F16H 57/04*    (2010.01)

(52) U.S. Cl.
    CPC ... *F16H 57/0457* (2013.01); *F16H 2048/364* (2013.01)

(56) References Cited

U.S. PATENT DOCUMENTS

| | | | |
|---|---|---|---|
| 10,384,535 B2 * | 8/2019 | Isono | B60K 17/046 |
| 10,442,291 B2 * | 10/2019 | Isono | B60K 23/04 |
| 10,895,320 B2 * | 1/2021 | Suyama | B60L 15/20 |
| 11,333,238 B2 * | 5/2022 | Ishikawa | F16H 57/0476 |
| 2007/0068735 A1 * | 3/2007 | Mori | B60K 17/046 |
| | | | 184/6.12 |
| 2018/0118023 A1 * | 5/2018 | Makino | F16H 57/04 |
| 2018/0141423 A1 | 5/2018 | Makino et al. | |
| 2019/0264790 A1 * | 8/2019 | Suzuki | F16H 57/04 |
| 2022/0048375 A1 | 2/2022 | Takahashi et al. | |

FOREIGN PATENT DOCUMENTS

| | | |
|---|---|---|
| JP | 3678904 B2 | 8/2005 |
| JP | 6471281 B1 * | 2/2019 |

OTHER PUBLICATIONS

International Search Report, issued in PCT/JP2019/050666, PCT/ISA/210, dated Feb. 15, 2020.
Written Opinion of the International Searching Authority, issued in PCT/JP2019/050666, PCT/ISA/237, dated Feb. 15, 2020.
Chinese Office Action and Search Report dated Apr. 18, 2023 for Application No. 201980094794.3 with an English translation.
Chinese Office Action dated Aug. 10, 2023 for Application No. 201980094794.3 with an English translation.
Chinese Office Action and Search Report for corresponding Chinese Application No. 201980094794.3, dated Dec. 22, 2023, with English translation.

* cited by examiner

LEFT-RIGHT WHEEL DRIVING DEVICE

TECHNICAL FIELD

This disclosure relates to a left-right wheel driving device that guides oil by teeth of gears.

BACKGROUND ART

Conventionally, as a mechanism for transmitting power from a driving source (engine or motor) of a vehicle, a device that distributes or changes the power via a large number of gears has been provided. For example, one of the known devices incorporates a planetary gear mechanism in a differential device so that the distribution of the driving torque to the left and right wheels can be changed.

Generally, in those devices, in order to cool and lubricate various components such as gears, rotating shafts, and bearings, oil is supplied into a casing that contains these components.

For example, Patent Literature 1 discloses a structure in which multiple oil passages (e.g., oil groove, oil hole, oil reservoir) are formed in a gear case (casing) into which the oil is injected, so that the oil scooped up by the rotation of a gear is supplied to a bearing through these oil passages. This structure may be able to well lubricate a differential device of a vehicle by supplying the oil scooped up by the gear to the differential device.

PRIOR ART DOCUMENTS

Patent Literature

[Patent Literature 1] Japanese Patent No. 3678904

SUMMARY

Problems

As described in Patent Literature 1, in cases where oil is supplied into a casing that contains components such as gears and bearings, a reservoir in which the oil accumulates is provided in the casing. In addition, a suction port for sucking out the oil is provided in this reservoir. If the oil enough to soak the entire suction port therein is accumulated in the reservoir, the oil is sucked out properly through the suction port. On the other hand, if the oil in the reservoir decreases or the oil surface is inclined so that the entire suction port is no longer soaked in the oil, air may enter the suction port, which may cause the oil not to be properly sucked out. As a solution to the above, a demand for a technique for easily sucking out oil in a reservoir (improving sucking capability) arises.

With the foregoing problems in view, one of the objects of the left-right wheel driving device of this disclosure is to enhance the capability of sucking oil in a casing. It addition to the above object, an effect that is derived from each configuration shown in the following detailed description and which is not obtained by the conventional technique can be regarded as another object of the present disclosure.

Means to Solve the Problem (1) The left-right wheel driving device disclosed herein includes: a casing including a reservoir that stores oil; a suction port that is disposed on the reservoir and that sucks the oil from the reservoir; and two gears that are each having helical teeth, that are supported so as to be rotatable about a rotating shaft at least in one direction, that are provided on a power transmission path that transmits power to left and right wheels of a vehicle, and that are spaced apart from each other. The suction port is positioned between the two gears. Each of the gears is offset from the suction port in an axial direction of the rotating shaft, being in a state of being partially immersed in the oil stored in the reservoir. The helical teeth of each of the gears extend in the one direction and in a direction that departs from the suction port. The above gears are referred to as helical-toothed gears or helical gears.

(2) It is preferable that the two gears serve as a first gear provided on a power transmission path of a first motor and a second gear provided on a power transmission path of a second motor, the first motor and the second motor driving the left and the right wheels.

(3) It is preferable that the left-right wheel driving device further includes a gear mechanism that amplifies a torque difference between the first motor and the second motor and distributes torques having the amplified torque difference to the left and the right wheels, and the first gear and the second gear are arranged so as to sandwich the gear mechanism.

(4) It is preferable that the one direction is a rotation direction that moves the vehicle forward.

(5) It is preferable that the left-right wheel driving device further includes: an upstream gear that is provided on a first shaft into which power is input first; a first intermediate gear that is provided on a second shaft disposed in parallel to the first shaft and that meshes with the upstream gear; and a second intermediate gear that is provided on the second shaft and that has a diameter different from that of the first intermediate gear, the rotating shaft is disposed in parallel to the first shaft, at least one of the two gears is provided on the rotating shaft and meshes with the second intermediate gear, and each of the first intermediate gear and the second intermediate gear has helical teeth extending in an opposite direction to that of the helical teeth of the at least one gear meshing with the second intermediate gear.

Effect

According to the disclosed left-right wheel driving device, when the two gears rotate in the one direction, the oil that has entered the teeth of each gear is scooped up toward the suction port, so that the oil can be collected in the suction port. Therefore, it is possible to enhance the capability of sucking the oil.

DETAILED DESCRIPTION

Description will now be made in relation to a left-right wheel driving device according to an embodiment with reference to the accompanying drawings. The following embodiment is merely illustrative and is not intended to exclude the application of various modifications and techniques not explicitly described in the embodiment. Each configuration of the present embodiment can be variously modified and implemented without departing from the gist thereof. Also, the configuration can be selected or omitted according to the requirement or appropriately combined. In the following explanation, the forward moving direction of a vehicle to which the left-right wheel driving device is applied is regarded as the forward direction (vehicle forward direction), and the left and right directions are defined on the basis of a state where the vehicle is directing forward.

The left-and-right direction is also referred to as the "vehicle width direction". In addition, the direction in which the gravity acts is defined as downward, and the opposite direction thereof is defined as upward.

[1. Configuration]
[1-1. Overall Configuration]

Figure 1:
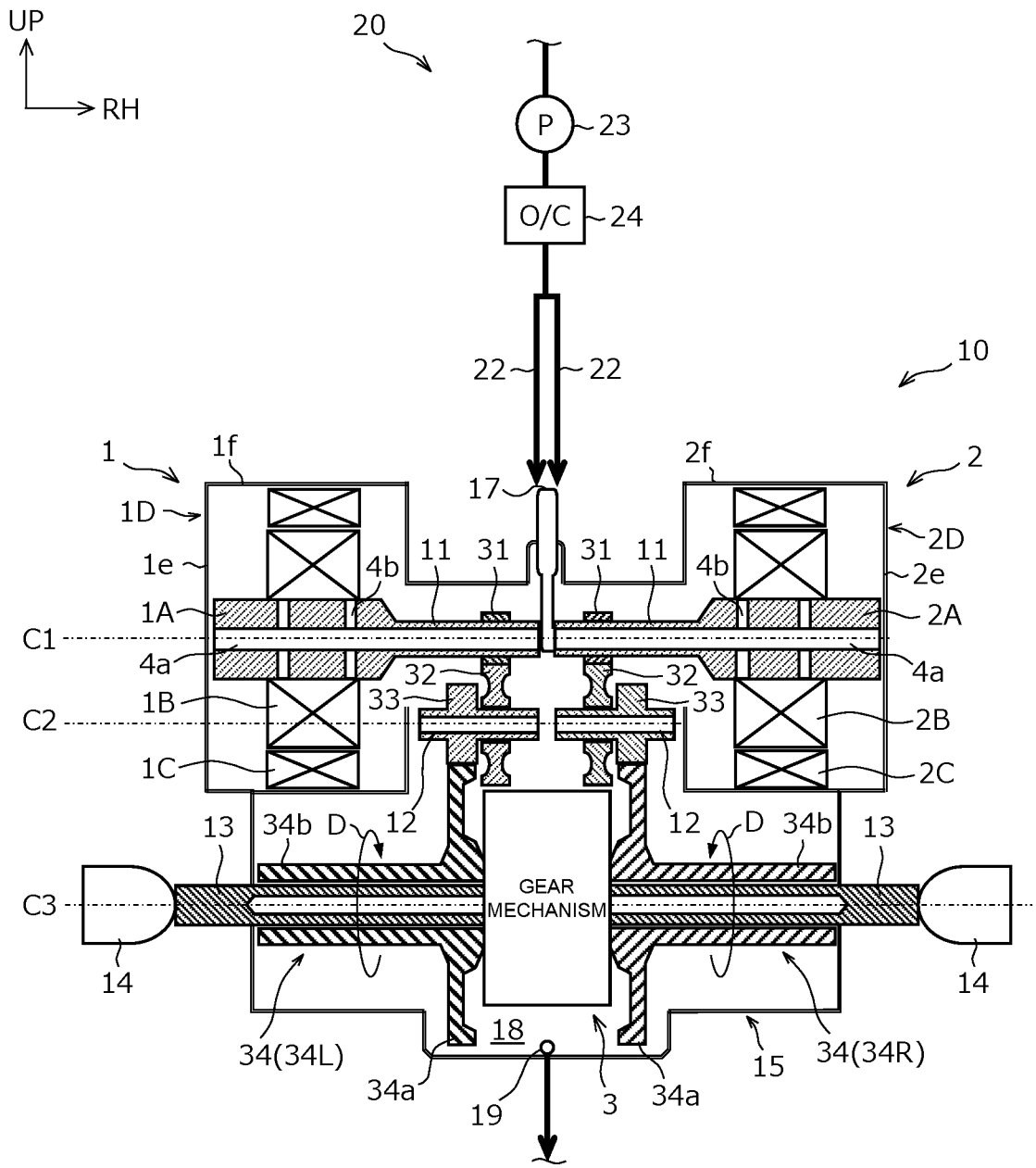
FIG. 1 is a schematic sectional view of a left-right wheel driving device according to an embodiment.

As shown in FIG. 1, a left-right wheel driving device 10 (hereinafter, simply referred to as "driving device 10") of the present embodiment is a differential device having an AYC (active yaw control) function, and is interposed between the left and right wheels of a vehicle. The AYC function adjusts the magnitude of the yaw moment by controlling the share ratio of the driving force (driving torque) on the left and the right driving wheels mainly, and thereby stabilizes the attitude in the yaw direction of the vehicle. Besides the AYC function, the driving device 10 of this embodiment also has a function for transmitting rotating force to the left and right wheels to run the vehicle, and a function for passively absorbing a difference in rotation speeds between the left and right wheels, which is generated when the vehicle turns.

The driving device 10 includes a first motor 1 and a second motor 2 that drive the left and right wheels, reduction gear trains that transmit rotation speeds of the first motor 1 and the second motor 2 while reducing the rotation speeds, and a gear mechanism 3 that amplifies a torque difference between the left and right wheels and distributes (transmits) torques having the amplified torque difference to the left and right wheels. The first motor 1 is disposed on the left side of the vehicle and the second motor 2 is disposed on the right side of the vehicle. The first motor 1 and the second motor 2 are AC motors driven by the power of non-illustrated batteries and preferably have similar output properties. Torque of each of the left and right drive wheels is variable, and the torque difference between the first motor 1 and the second motor 2 is amplified in the gear mechanism 3 and the torques having the amplified torque difference are transmitted to each of the left and right wheels.

The first motor 1 is provided with a rotor 1B which rotates integrally with a shaft part 1A, and a stator 1C fixed to a motor housing 1D. Similarly, the second motor 2 is provided with a rotor 2B which rotates integrally with a shaft part 2A, and a stator 2C fixed to a motor housing 2D. A magnet (not shown) is provided on the rotor 1B, and a coil (not shown) is provided on the stator 1C. Similarly, a magnet (not shown) is provided on the rotor 2B, and a coil (not shown) is provided on the stator 2C.

The first motor 1 and the second motor 2 are disposed apart from and facing to each other in such an attitude that both of the two shaft parts 1A and 2A extend in the vehicle width direction. The shaft parts 1A and 2A are coaxially disposed so that the respective rotation centers C1 match. Further, on each of the shaft parts 1A and 2A, holes 4b are drilled so as to communicate with the inner space 4a of each of the shaft parts 1A and 2A. Each hole 4b has a function of radially scattering oil (to be described below) in the inner space 4a by utilizing the centrifugal force accompanied by the rotation of the corresponding shaft part 1A or 2A. The number, the arrangement, the shape of the holes 4b are not particularly limited and are preferably ones that easily scatter oil radially outward.

The driving device 10 of the present embodiment is provided with two sets of three shafts 11-13 arranged in parallel, and the reduction gear train that reduces the speed in two stages is provided to each set of these three shafts 11-13. Hereinafter, the three shafts 11-13 are referred to as a motor shaft (first shaft) 11, a counter shaft (second shaft) 12, and an output shaft (rotating shaft) 13 in order from the upstream side of the power transmission path from each of the motors 1 and 2 to the left and right wheels. Two shafts are provided as each type of the shafts 11-13. The two motor shafts 11, the two counter shafts 12, and the two output shafts 13, which are positioned on the left and the right, are configured similarly (symmetrically). Further, the reduction gear trains provided on these shafts 11-13 are also configured similarly (symmetrically).

Each of the motor shafts 11 is a shaft into which the power is first input, and is formed in a hollow cylindrical shape with the rotation center C1, and is located coaxially with the each of the shaft parts 1A and 2A of the left and right motors 1 and 2. The motor shafts 11 of the present embodiment are each provided integrally with one of the shaft parts 1A and 2A, and the inner space of each motor shaft 11 is provided so as to communicate with the inner space 4a of one of the shaft parts 1A and 2A. Alternatively, each motor shaft 11 and the corresponding shaft part 1A or 2A may be provided separately and coupled or joined to each other. A motor gear (upstream gear) 31 is fixed to (provided on) each of the motor shafts 11. Each motor shaft 11 is positioned between the first motor 1 and the second motor 2, and pivotally supported by two bearings (non-illustrated) spaced apart from each other.

Each of the counter shafts 12 is formed in a hollow cylindrical shape with a rotation center C2 and is disposed parallel to the motor shafts 11. To (on) the counter shaft 12, a first intermediate gear 32 which meshes with the motor gear 31 and a second intermediate gear 33 having a diameter smaller than (different from) that of the first intermediate gear 32 are fixed (provided). The second intermediate gear 33 on the left side is disposed closer to the first motor 1 than (on the left side of) the first intermediate gear 32 on the left side, and the second intermediate gear 33 on the right side is disposed closer to the second motor 2 than (on the right side of) the first intermediate gear 32 on the right side. This means that the first intermediate gears 32 having large diameters are disposed inside in the vehicle width direction as compared to the second intermediate gears 33 having small diameters. These intermediate gears 32 and 33 are preferably disposed close to each other. The motor gears 31 and the first intermediate gears 32 collectively constitute first stages of the reduction gear trains.

Each counter shaft 12 is located between the first motor 1 and the second motor 2, and is rotatably supported by two bearings (not shown) spaced apart from each other. The counter shafts 12 are preferably disposed such that, in a side view, the first intermediate gears 32 are positioned radially inside the respective outer circumference faces 1f and 2f of the first motor 1 and the second motor 2. That is, when viewed from a side of the vehicle, it is preferable that the gears 32 and 33 on the counter shafts 12 completely overlap the motors 1 and 2.

Each of the output shafts 13 is formed in a hollow cylindrical shape with a rotation center C3 and is disposed parallel to the motor shafts 11. An output gear 34 that meshes with the second intermediate gear 33 is provided on each of the output shafts 13. The second intermediate gears 33 and the output gears 34 collectively constitute second stages of the reduction gear trains. These gears 31-34 are positioned on the power transmission paths from the left and right motors 1 and 2 to the left and right wheels. Specifically, among the two sets of the shafts 11-13, the gears 31-34 provided on the three shafts 11-13 on the left side are provided on the power transmission path of the first motor 1, and the gears 31-34 provided on the three shafts 11-13 on the right side are provided on the power transmission path of the second motor 2.

As above, the output gears 34 of the present embodiment transmit power from the first motor 1 and the second motor 2 to the left and right wheels, and include the output gear (first gear) 34L on the left side, which is provided on the power transmission path of the first motor 1, and the output gear (second gear) 34R on the right side, which is provided on the power transmission path of the second motor 2. Hereinafter, when the two output gears 34L and 34R are distinguished from each other, the former is also referred to as a left output gear 34L and the latter is also referred to as a right output gear 34R. The left output gear 34L and the right output gear 34R are spaced apart from each other in the vehicle width direction.

Each output gear 34 of the present embodiment has a cylindrical portion 34b provided integrally with a tooth portion 34a where the external teeth are formed, and is attached to the output shaft 13 at the cylindrical portion 34b being slidably outer-fitted to a part of the outer circumference face of the output shaft 13. The output gears 34 have the largest diameters in the driving device 10. Incidentally, teeth to be described below are formed in the tooth portions 34a.

The output gears 34 of the present embodiment are supported so as to be rotatable in two directions around the respective output shafts 13. Hereinafter, the rotating direction (one direction) D of the output shafts 13 and the output gears 34 when the vehicle moves forward is also referred to as "forward rotating direction D". Incidentally, the output shafts 13 and the output gears 34 rotate, when the vehicle reverses, in the direction opposite to the forward rotating direction D. When viewed from the axial direction of the shafts 11-13 (the direction along the rotation centers C1, C2, and C3), the rotating directions of the motor shafts 11 and the rotating direction of output shafts 13 are identical to each other, and are both opposite to the rotating directions of the counter shafts 12. Therefore, the rotating directions of the motor gears 31 and the output gears 34 are opposite to the rotating directions of the intermediate gears 32 and 33.

The gear mechanism 3 is disposed on one end side (inner side in the vehicle width direction) of each output shaft 13, and one of the left and right wheels is disposed on the other end side (outer side in the vehicle width direction) of each output shaft 13. That is, in the driving device 10, the left and right motors 1 and 2 are not disposed on the output shafts 13 provided with the left and right wheels, but are disposed offset from the output shafts 13. Incidentally, FIG. 2 omits illustrations of the left and right wheels, but shows joint parts 14 to be coupled to the left and right wheels.

The gear mechanism 3 of the present embodiment has a function of amplifying the torque difference at a predetermined amplification factor, and consists of, for example, a differential mechanism or a planetary gear mechanism. Into an input element of the gear mechanism 3, torques from the first motor 1 and the second motor 2 are input, and an output element of the gear mechanism 3 is provided so as to integrally rotate with the output shafts 13. Additionally, the gear mechanism 3 includes multiple non-illustrated bearings.

The gear mechanism 3 of the present embodiment is positioned under the first motor 1 and the second motor 2 and is disposed between the left output gear 34L and the right output gear 34R. Each output shaft 13 of the present embodiment is supported so as to be rotatable with respect to the casing 15 by a structure that the cylindrical portion 34b outer-fitted to the output shaft 13 is pivotally supported by two bearings (not shown) spaced apart from each other. The joint parts 14 are disposed on the outer ends in the vehicle width direction of the respective output shafts 13 and also on the respective outer sides in the vehicle width direction of the end faces 1e and 2e on the respective outer sides in the vehicle width direction of the first motor 1 and the second motor 2. In other words, the lengths of the output shafts 13 are set such that the joint parts 14 are positioned on the outer sides in the vehicle width direction of the end faces 1e and 2e of the respective motors 1 and 2.

The casing 15 of the present embodiment is connected to each of the motor housings 1D and 2D, and accommodates, for example, each of the shafts 11-13 and the gear mechanism 3. The casing 15 may be of a single body or may be of a combination of multiple parts. The upper face of the casing 15 is positioned nearer to the rotation center C1 than to the upper faces of the outer circumference faces 1f and 2f of the respective motor housings 1D and 2D. With this structure, the driving device 10 is provided with a recess part 16 positioned between the first motor 1 and the second motor 2 and also on the upper part of the casing 15. The recess part 16 forms a space between the left and right motors 1 and 2 and also over the motor shafts 11, and can be also regarded as a portion recessed toward the inside of the casing 15.

[1-2. Main Configuration]

To the driving device 10 of the present embodiment, a circulation path 20 through which oil for cooling and lubricating circulates is connected. On this circulation path 20, at least an oil pump 23 for pumping the oil and an oil cooler 24 that cools the oil are provided. The oil pumped by the oil pump 23 is cooled by the oil cooler 24 and then supplied to the driving device 10.

The circulation path 20 of the present embodiment includes at least shaft-center oil paths 22 serving as paths of the oil to be sprayed radially from the shaft parts 1A and 2A of the respective motors 1 and 2. The shaft-center oil paths 22 are provided one for each of the left and right motors 1 and 2.

The driving device 10 of the present embodiment is provided with inlets 17 that inject the oil from the circulation path 20 into the motor housings 1D and 2D and the casing 15, a reservoir 18 that stores the oil, and a suction port 19 that sucks the oil from the reservoir 18. That is, one end of the circulation path 20 (one end of each shaft-center oil path 22) is connected to the inlets 17, and the other end thereof is connected to the suction port 19.

Both of the inlets 17 to which the left and right shaft-center oil paths 22 are connected are disposed in a space (the recess part 16) between the two motor housings 1D and 2D, and are provided on a projection formed in the recess part 16. The oil injected from one of the two inlets 17 is guided to the side of the first motor 1 (left side), and the oil injected from the other one of the two inlets 17 is guided to the side of the second motor 2 (right side). Incidentally, FIG. 1 illustrates the two inlets 17 arranged side by side in a direction perpendicular to the drawing, but the two inlets 17 may alternatively be arranged side by side in the vehicle width direction.

In the driving device 10 of the present embodiment, the oil injected from the inlets 17 flows, through the inner space of the left and right motor shafts 11 and the inner spaces 4a of the shaft parts 1A and 2A, to the sides of the end faces 1e and 2e of the motors 1 and 2. At this time, if the shaft parts 1A and 2A are rotating, by the centrifugal force associated with this rotation, the oil in the inner spaces 4a radially scatter through the holes 4b to cool the coils and the magnets. Further, the remainder of the oil injected from the inlets 17 falls straightly downward, and contributes to lubricating the bearings that support the shafts 11-13, the bearings in the gear mechanism 3, and so on.

The reservoir 18 is provided at the bottom portion of the casing 15, and is in the shape of a container that stores the oil downwardly dropped. The above-described suction port 19 is disposed on the reservoir 18. The oil in the reservoir 18 is sucked from the suction port 19 to the outside of the reservoir 18 (i.e., to the circulation path 20) by the effect of the oil pump 23. Then, the oil is pumped to the oil cooler 24 by the oil pump 23, passes through the oil cooler 24, and is again injected from the inlets 17 into the motor housings 1D and 2D and the casing 15.

Figure 2:
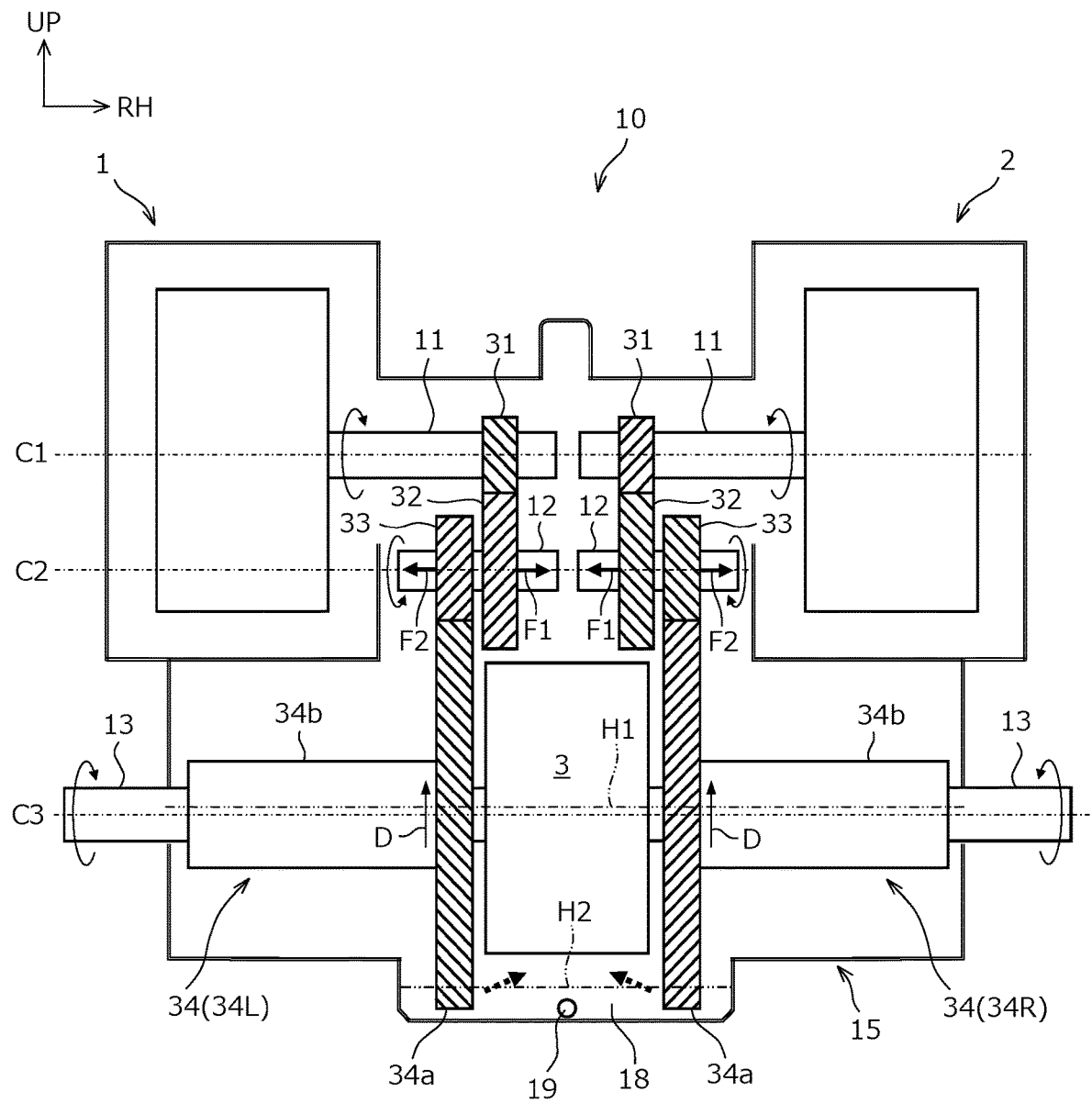
FIG. 2 is a schematic side view illustrating the internal structure of the left-right wheel driving device according to the embodiment.

The height level of the oil surface (liquid level) of the oil stored in the reservoir 18 comes to be the highest when the oil is not circulating (i.e., when the oil pump 23 is not in operation) and the lowest when the oil is circulating (i.e., when the oil pump 23 is in operation). Hereinafter, the level at which the oil surface is the highest is referred to as the "highest oil level H1", and the level at which the oil surface is the lowest is referred to as the "lowest oil level H2". As shown in FIG. 2, in the present embodiment, the highest oil level H1 is set to a position above the rotation centers C3 of the output shafts 13, and the lowest oil level H2 is set to a position at least above the suction port 19 and at which the output gears 34 are partially immersed. That is, the output gears 34 are disposed in a state of being partially immersed (in a state where the bottom portion of the tooth part 34a is immersed) in the oil stored in the reservoir 18.

The output gears 34 are offset in the axial direction of the output shafts 13 (the direction in which the rotation centers C3 extend) from the suction port 19. The left output gear 34L and the right output gear 34R of the present embodiment are disposed so as to sandwich the suction port 19 and the gear mechanism 3. In other words, the suction port 19 and the gear mechanism 3 are positioned between (on the inner side in the vehicle width direction of) the left output gear 34L and the right output gear 34R. The present embodiment illustrates a case where, in the axial direction of the output shafts 13, the suction port 19 is disposed at a position substantially intermediate between the left output gear 34L and the right output gear 34R.

All of the gears 31-34 are helical-toothed gears (helical gears) having helical teeth. Therefore, the teeth of the gears 31-34 are not parallel to the rotation centers C1, C2, and C3, but are inclined with respect to the rotation centers C1, C2, and C3. The twisting direction of the teeth of each output gear 34 is set on the basis of the forward rotating direction D and the arrangement of the suction port 19. Further, the twisting directions of the teeth of the input gears 31 and the intermediate gears 32 and 33 are set according to the twisting directions of the teeth of the output gears 34.

Specifically, the teeth of the output gears 34 extend in the forward rotating direction D and a direction that departs from the suction port 19. Focusing on the left output gear 34L, since the suction port 19 is positioned on the right side of the left output gear 34L, the teeth of the left output gear 34L extend in the forward rotating direction D and also to the left. On the other hand, focusing on the right output gear 34R, since the suction port 19 is positioned on the left side of the right output gear 34R, the teeth of the right output gear 34R extend in the forward rotating direction D and also to the right.

In the example shown in FIG. 2, the left output gear 34L is a so-called right-hand gear (a gear with the teeth extending upward to the right when the rotating shaft is directed upright), and the right output gear 34R is a so-called left-hand gear (a gear with the teeth extending upward to the left when the rotating shaft is directed upright). Thus, the left output gear 34L and the right output gear 34R have respective teeth twisted in opposite directions to each other. Incidentally, in the driving device 10 of the present embodiment, since the reduction gear trains are configured symmetrically, the magnitude of the helix angle of the left output gear 34L and the magnitude of the helix angle of the right output gear 34R are set to be equal.

Each of the second intermediate gears 33 is set to have teeth twisted in the opposite direction to that of the output gear 34 with which the corresponding second intermediate gear 33 meshes. Specifically, the teeth of the second intermediate gear 33 on the left side extend in the opposite direction relative to that of the teeth of the left output gear 34L, and the teeth of the second intermediate gear 33 on the right side extend in the opposite direction relative to that of the teeth of the right output gear 34R. Here, the "opposite direction" means a twisting direction in which the teeth on gears can mesh with each other. Specifically, the second intermediate gear 33 on the left side is set to be a left-hand gear so as to be able to mesh with the left output gear 34L being a right-hand gear, and the second intermediate gear 33 on the right side is set to be a right-hand gear so as to be able to mesh with the right output gear 34R being a left-hand gear.

Further, the first intermediate gear 32 and the second intermediate gear 33 provided on the same counter shaft 12 are set to have teeth twisted in the same direction. Focusing on the counter shaft 12 on the left side, the teeth of the first intermediate gear 32 and the second intermediate gear 33 provided on this counter shaft 12 extend in the opposite direction to that of the teeth of the left output gear 34L. That is, this first intermediate gear 32 and this second intermediate gear 33 (on the left side) are both set to be left-hand gears. Furthermore, focusing on the counter shaft 12 on the right side, the teeth of the first intermediate gear 32 and the second intermediate gear 33 provided on this counter shaft 12 extend in the opposite direction to that of the teeth of the right output gear 34R. That is, this first intermediate gear 32 and this second intermediate gear 33 (on the right side) are both set to be right-hand gears.

Each of the input gears 31 is set to have teeth twisted in the opposite direction to that of the first intermediate gear 32 with which the corresponding input gear 31 meshes. Specifically, the teeth of the input gear 31 on the left side extend in the opposite direction to that of the teeth of the first intermediate gear 32 on the left side, and the teeth of the input gear 31 on the right side extend in the opposite direction to that of the teeth of the first intermediate gear 32 on the right side. In the example shown in FIG. 2, the input gear 31 on the left side is a right-hand gear, and the input gear 31 on the right side is a left-hand gear.

[2. Action]

When the vehicle moves forward, the input shafts 11 each rotate by the power of one of the first motor 1 and the second motor 2. This accompanies rotation of the respective input gears 31 and the power is transmitted from the input gears 31 to the first intermediate gears 32 to rotate the counter shafts 12. Further, the rotation of the counter shafts 12 transmits power from the second intermediate gears 33 to the output gears 34, so that the output gears 34 rotate in the forward rotating direction D.

As described above, the output gears 34 are disposed in a state of being partially immersed in the oil stored in the reservoir 18, which allows the oil to enter some of the teeth of the output gears 34. This oil is scooped up with the rotation of the output gears 34. Since the teeth of the output gears 34 extend in the directions described above, the output gears 34, when rotating in the forward rotating direction D, scoop up the oil that has entered the teeth toward the suction port 19 (see the broken line arrows in FIG. 2). In the present embodiment, the left output gear 34L scoops up the oil to the right side, and the right output gear 34R scoops up the oil to the left side.

Consequently, in the reservoir 18, the oil is guided from each output gear 34 toward the suction port 19 and the gear mechanism 3. Collecting the oil at the suction port 19 as such makes it easy to suck the oil from the suction port 19. This configuration enhances the circulation performance of the oil in the circulation path 20, so that the oil surface in the reservoir 18 is easily kept higher than the lowest oil level H2. Further, guiding the oil to the gear mechanism 3 encourages cooling and lubricating of the gear mechanism 3.

Incidentally, the gears 31-34 being helical gears can smoothly transmit power as compared with normal spur gears, but on the other hand, have possibilities of having larger axial forces (thrust forces) caused by the helix angles of the teeth. With regard to this, on each of the counter shafts 12, the twisting direction of the teeth of the first intermediate gear 32 to which the power is transmitted from the motor gear 31 coincides with the twisting direction of the teeth of the second intermediate gear 33 that transmits the power to the output gear 34, so that the axial force F1 of the first intermediate gear 32 and the axial force F2 of the second intermediate gear 33 act in the opposite direction to each other. For example, as shown in FIG. 2, when the vehicle moves forward with the power of the first motor 1 and the second motor 2, the axial forces F1 of the first intermediate gears 32 act inward in the vehicle width direction, whereas the axial forces F2 of the second intermediate gears 33 act outward in the vehicle width direction. This reduces the overall axial force on the counter shafts 12.

[3. Effect]

(1) According to the driving device 10 described above, when the output gears 34 rotate in the forward rotating direction D, the oil in the reservoir 18 is scooped up toward the suction port 19 by the teeth of the output gears 34, and consequently, the oil can be collected in the suction port 19. Thus, even if the oil surface in the reservoir 18 fluctuates or inclines, entrainment of air into the suction port 19 is suppressed, so that the capability of sucking the oil in the casing 15 can be enhanced.

In particular, if the oil sucked out from the suction port 19 is supplied again into the casing 15 (if the oil circulates), the above-described enhancement in capability of sucking the oil strengthens the circulation performance of the oil. This enhances the lubricability and coolability of the components by the oil and also suppresses a drop in the oil surface in the reservoir 18.

Further, by positioning the suction port 19 between the two output gears 34 provided in the driving device 10, it is possible to scoop up the oil from each of the two output gears 34 toward the suction port 19. Consequently, more oil can be collected in the suction port 19. This makes it possible to enhance the performance of the driving device 10.

(2) The left output gear 34L described above is provided on the power transmission path of the first motor 1, and the right output gear 34R described above is provided on the power transmission path of the second motor 2. As such, by disposing the output gears 34 on the respective power transmission paths of the two motors 1 and 2 that drive the left and right wheels of the vehicle, the oil can be scooped up from each of the output gears 34 toward the suction port 19 by utilizing the power of each of the motors 1 and 2.

(3) Further, since the above-described output gears 34 (left output gear 34L and right output gear 34R) are disposed so as to sandwich the gear mechanism 3 for distributing the torques to the left and right wheels, it is also possible to scoop up the oil from each of the left and right output gears 34 toward the gear mechanism 3. This can encourage cooling and lubrication of the gear mechanism 3 provided in the driving device 10. This makes it possible to further enhance the performance of the driving device 10.

(4) Since vehicle moves forward more frequently than moving backward, the oil can be collected in the suction port 19 at a high frequency by setting the twisting direction of the teeth of each output gear 34 so that the output gears 34 scoop up the oil toward the suction port 19 when the vehicle moves forward (by setting the teeth to extend in the forward rotating direction D and in the direction that departs from the suction port 19).

(5) Since the first intermediate gear 32 and the second intermediate gear 33 provided on each counter shaft 12 have helical teeth extending in the opposite direction to that of the teeth of the output gear 34 that meshes with the second intermediate gear 33, it is possible to cause the axial force F1 of the first intermediate gear 32 and the axial force F2 of the second intermediate gear 33 to act in opposite directions to each other. This can reduce the overall axial force on each counter shaft 12. Consequently, it is possible to increase the positional accuracy in the axial direction of the first intermediate gears 32 and the second intermediate gears 33.

[4. Modification]

The arrangement of the output gears 34 illustrated in the foregoing embodiment is exemplary. The output gears 34 only need to be offset from the suction port 19 in the axis direction of the output shafts 13 and also to have the helical teeth extending in the directions described above, and do not have to be disposed so as to sandwich the gear mechanism 3, for example. Even in cases where the output gears 34 are not disposed so as to sandwich the gear mechanism 3, the capability of sucking the oil in the casing 15 can be enhanced by the output gears 34 scooping up the oil in the reservoir 18 toward the suction port 19.

Since a larger helix angle of the teeth makes the output gears 34 easier to scoop up the oil, the helix angle of the teeth are preferably set larger from the viewpoint of collecting the oil in the suction port 19. However, since a larger helix angle generally tends to increase the axial force in helical gears, the specific helix angle of the teeth of the above output gears 34 is preferably set in consideration of the tradeoff with respect to the magnitude of the axial force allowed in the output shafts 13.

The output gears 34 should be rotatable at least in one direction about the output shafts 13 and may alternatively be configured to be rotatable only in the forward rotating direction D described above. Further, the driving device 10 may apply the above structure of gears that scoop up the oil toward the suction port 19 to gears except for the output gears 34.

The above configuration of the driving device 10 is exemplary. The diameters of the two intermediate gears 32 and 33 provided on each counter shaft 12 only need to be different from each other, and, for example, a step-up gear train may be configured by using a second intermediate gear having a larger diameter than that of the first intermediate gear 32. Also in this case, as described above, the overall axial force on the counter shaft 12 can be reduced by setting the twisting directions of the teeth of the two intermediate gears provided on the counter shaft 12 so as to extend in the opposite direction to that of the teeth of the output gear.

The configuration of the circulation path 20 described above is also exemplary. In addition to the shaft-center oil paths 22 described above, the circulation path 20 may be further provided with straight oil paths serving as passages of oil to be directly provided (dropped) to the coils of the motors 1 and 2. The path for letting the oil flow in the driving device 10 described above is also exemplary. The oil path only has to be set such that the oil accumulates at least in the reservoir 18 of the casing 15.

DESCRIPTION OF REFERENCE SIGNS 1 first motor
1A shaft part
2 second motor
2A shaft part
3 gear mechanism
10 driving device (left-right wheel driving device)
11 motor shaft (first shaft)
12 counter shaft (second shaft)
13 output shaft
15 casing
18 reservoir
19 suction port
31 motor gear (upstream gear)
32 first intermediate gear
33 second intermediate gear
34 output gear (gear)
34L left output gear (first gear)
34R right output gear (second gear)
D forward rotating direction (one direction)

The invention claimed is:

1. A left-right wheel driving device comprising:
a casing including a bottom face portion and a reservoir that stores oil;
a suction port that is disposed on the reservoir and that sucks the oil from the reservoir to outside of the casing; and
two gears that are each having helical teeth, that are supported so as to be rotatable at least in one rotation direction around respective two rotating shafts which have a same rotation center, that are provided on a power transmission path that transmits power to left and right wheels of a vehicle, and that are spaced apart from each other, and that are accommodated in the casing, wherein
the reservoir is provided with a lower space formed in not a side portion but a center portion of the bottom face portion in an axial direction of the two rotating shafts, the lower space communicating in the axial direction,
the center portion of the bottom face portion forms a straight cross section parallel to the two rotating shafts,
the suction port is arranged at the lower space formed in the center portion and is positioned between the two gears and is arranged close to the two gears,
each of the two gears is offset from the suction port in the axial direction, being in a state of being partially immersed in the oil stored in the reservoir, and a lower portion of each of the two gears is positioned in the lower space and
the helical teeth of each of the two gears extend in the one rotation direction and in the axial direction that departs from the suction port.

2. The left-right wheel driving device according to claim 1, wherein the two gears serve as a first gear provided on a power transmission path of a first motor and a second gear provided on a power transmission path of a second motor, the first motor and the second motor driving the left and the right wheels.

3. The left-right wheel driving device according to claim 2, further comprising
a gear mechanism that amplifies a torque difference between the first motor and the second motor and distributes torques having the amplified torque difference to the left and the right wheels, wherein
the first gear and the second gear are arranged so as to sandwich the gear mechanism.

4. The left-right wheel driving device according claim 3, wherein the one rotation direction is a rotation direction that moves the vehicle forward.

5. The left-right wheel driving device according to claim 4, further comprising:
an upstream gear that is provided on a first shaft into which power is input first;
a first intermediate gear that is provided on a second shaft disposed in parallel to the first shaft and that meshes with the upstream gear; and
a second intermediate gear that is provided on the second shaft and that has a diameter different from that of the first intermediate gear, wherein
at least one of the two rotating shafts is disposed in parallel to the first shaft,
at least one of the two gears is provided on a respective one of the two rotating shafts and meshes with the second intermediate gear, and
each of the first intermediate gear and the second intermediate gear has helical teeth extending in an opposite direction to that of the helical teeth of a respective one of the two gears meshing with the second intermediate gear.

6. The left-right wheel driving device according to claim 3, further comprising:
an upstream gear that is provided on a first shaft into which power is input first;
a first intermediate gear that is provided on a second shaft disposed in parallel to the first shaft and that meshes with the upstream gear; and
a second intermediate gear that is provided on the second shaft and that has a diameter different from that of the first intermediate gear, wherein
at least one of the two rotating shafts is disposed in parallel to the first shaft,
at least one of the two gears is provided on a respective one of the two rotating shafts and meshes with the second intermediate gear, and
each of the first intermediate gear and the second intermediate gear has helical teeth extending in an opposite direction to that of the helical teeth of a respective one of the two gears meshing with the second intermediate gear.

7. The left-right wheel driving device according claim 2, wherein the one rotation direction is a rotation direction that moves the vehicle forward.

8. The left-right wheel driving device according to claim 7, further comprising:
an upstream gear that is provided on a first shaft into which power is input first;
a first intermediate gear that is provided on a second shaft disposed in parallel to the first shaft and that meshes with the upstream gear; and
a second intermediate gear that is provided on the second shaft and that has a diameter different from that of the first intermediate gear, wherein
at least one of the two rotating shafts is disposed in parallel to the first shaft,
at least one of the two gears is provided on a respective one of the two rotating shafts and meshes with the second intermediate gear, and
each of the first intermediate gear and the second intermediate gear has helical teeth extending in an opposite direction to that of the helical teeth of a respective one of the two gears meshing with the second intermediate gear.

9. The left-right wheel driving device according to claim 2, further comprising:
an upstream gear that is provided on a first shaft into which power is input first;
a first intermediate gear that is provided on a second shaft disposed in parallel to the first shaft and that meshes with the upstream gear; and
a second intermediate gear that is provided on the second shaft and that has a diameter different from that of the first intermediate gear, wherein
at least one of the two rotating shafts is disposed in parallel to the first shaft,
at least one of the two gears is provided on a respective one of the two rotating shafts and meshes with the second intermediate gear, and
each of the first intermediate gear and the second intermediate gear has helical teeth extending in an opposite direction to that of the helical teeth of a respective one of the two gears meshing with the second intermediate gear.

10. The left-right wheel driving device according to claim 1, wherein the one rotation direction is a rotation direction that moves the vehicle forward.

11. The left-right wheel driving device according to claim 10, further comprising:
an upstream gear that is provided on a first shaft into which power is input first;
a first intermediate gear that is provided on a second shaft disposed in parallel to the first shaft and that meshes with the upstream gear; and
a second intermediate gear that is provided on the second shaft and that has a diameter different from that of the first intermediate gear, wherein
at least one of the two rotating shafts is disposed in parallel to the first shaft,
at least one of the two gears is provided on a respective one of the two rotating shafts and meshes with the second intermediate gear, and
each of the first intermediate gear and the second intermediate gear has helical teeth extending in an opposite direction to that of the helical teeth of a respective one of the two gears meshing with the second intermediate gear.

12. The left-right wheel driving device according to claim 1, further comprising:
an upstream gear that is provided on a first shaft into which power is input first;
a first intermediate gear that is provided on a second shaft disposed in parallel to the first shaft and that meshes with the upstream gear; and
a second intermediate gear that is provided on the second shaft and that has a diameter different from that of the first intermediate gear, wherein
at least one of the two rotating shafts is disposed in parallel to the first shaft,
at least one of the two gears is provided on a respective one of the two rotating shafts and meshes with the second intermediate gear, and
each of the first intermediate gear and the second intermediate gear has helical teeth extending in an opposite direction to that of the helical teeth of a respective one of the two gears meshing with the second intermediate gear.

13. The left-right wheel driving device according to claim 1, wherein the reservoir is in a shape of a container and is recessed in the bottom face portion.

14. The left-right wheel driving device according to claim 1, further comprising an inlet that is disposed on the casing and injects the oil into the casing.

* * * * *